Aug. 23, 1932.  G. S. LANE  1,872,986
CLUTCH
Filed Aug. 13, 1931
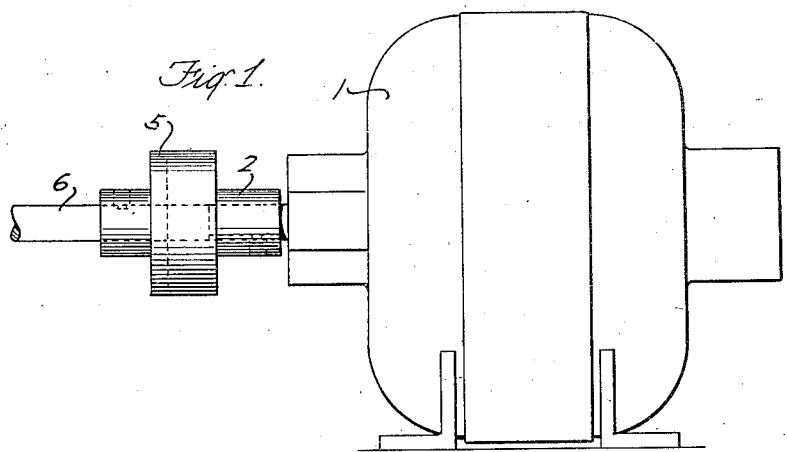
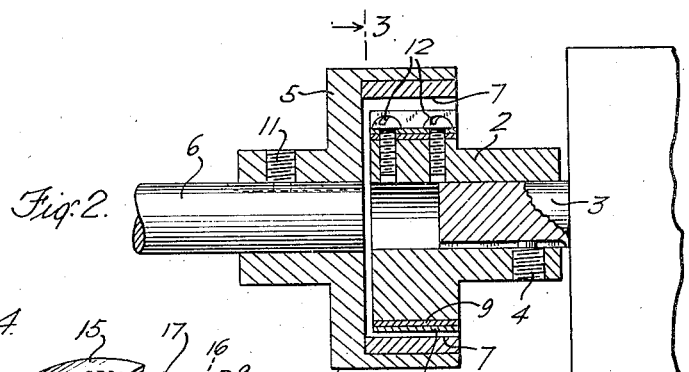
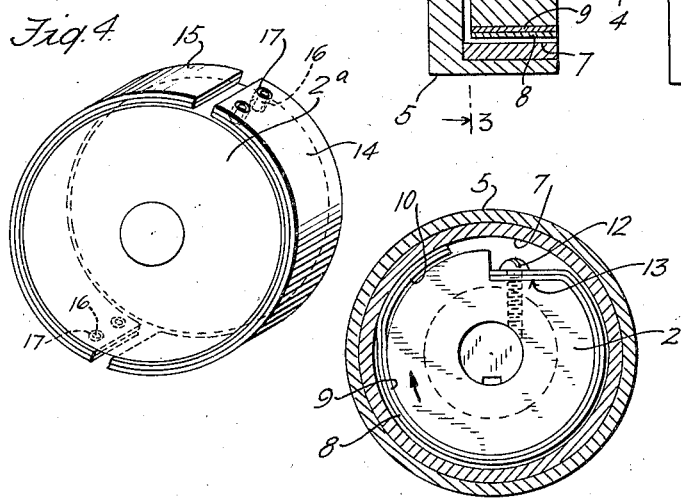
INVENTOR
GEORGE S. LANE
BY
ATTORNEY Patented Aug. 23, 1932

1,872,986

UNITED STATES PATENT OFFICE

GEORGE S. LANE, OF PASSAIC, NEW JERSEY, ASSIGNOR TO RAYBESTOS-MANHATTAN, INC., A CORPORATION OF NEW JERSEY

CLUTCH

Application filed August 13, 1931. Serial No. 556,750.

My invention relates to a clutch, particularly one which provides a thormostatically operated gradual engagement of the driving and driven members and which will after engagement transmit the full torque load with a minimum of slippage between the driving and driven members, and which will automatically release upon stoppage of the driving member. Other advantages will appear in the following description.

The clutch is particularly adaptable for use in connection with an electric motor which should be brought approximately up to speed before the full load is imposed.

My invention may be embodied in various forms. In the drawing I have, for the purpose of illustration, shown two embodiments of my invention.

In the drawing Fig. 1 is a side elevation;

Fig. 2 is an enlarged section;

Fig. 3 a transverse section on the line 3—3 of Fig. 2; and

Fig. 4 is a modification.

In the embodiment shown in Figs. 1, 2 and 3, which is merely illustrative of the invention, 1 is a suitable source of power such as a self-starting electric motor. 2 is the driving member which is detachably fastened to the armature shaft 3 of the motor by the set screw 4. 5 is the driven member which may be similarly fastened to the shaft 6 which is connected to the load to be driven.

Each of the driving and driven members is provided with a suitable face which may be brought into engagement in order to transmit the power. These may be of various forms. In the present embodiment I have provided a friction face 7 stationarily carried by the driven member 5. The face of one member is preferably relatively movable, so that it may be brought into and out of driving engagement with the other face. In the illustrated embodiment the friction face of the driving member is made movable relatively to it. This relatively movable face is represented by 8. The direction of rotation is indicated by the arrow in Fig. 3.

The driving member and its face are preferably substantially freely rotatable with respect to the driven face initially, and the driving face is preferably moved into contact with the driven face automatically and into driving engagement with the driven face thermostatically. If this initial contact is desired it may be accomplished by either centrifugal or thermostatic action, or by both, but the driving engagement is maintained thermostatically. The driving friction face is the outer surface of a bi-metallic strip 8—9 which is fastened at one end to a seat 13 on the driving member 2 by the screws 12, and is expanded by thermostatic action. As shown, it is preferably free at the forward end in the direction of rotation of the driving member 2. It may or may not initially touch the friction face 7. As the motor starts the bi-metallic elements will, of course, be rotated in the direction of the arrow, and as the speed increases the strips will (if so designed) be thrown out by centrifugal action so as to bring the outwardly-bent portion 10 of the bi-metallic element into engagement with the friction face 7, if it were not initially in rubbing contact therewith. I however prefer to form the bi-metallic element 8 so that it has a slight initial contact with the friction face 7. This is provided by the outwardly-bent portion 10, and, in order gradually to bring the rest of the face of the element into frictional engagement with the face 7 I prefer to make the strips or strip 8 of invar, or steel and the strip 9 of brass, which have different co-efficients of expansion as is well known in such thermostatic strips. As the motor gathers speed the friction between the faces will of course generate heat and this will gradually expand the bi-metallic element into contact with the driven face 7 and so apply a gradually increasing torque to the driven member.

As the friction surface increases, due to the relative difference in speeds and consequent expansion of the bi-metallic strip, it will eventually force itself out into engagement with the friction face 7 throughout substantially the entire effective length of the strip, and the load will be taken up. The action is gradual when there is any material load.

As the driving member brings the driven member up to speed, the difference in speed between the driving and driven members decreases, with a consequent decrease in the rubbing friction and decrease in the heating effect and consequent tendency of the thermostatic-strips to cool off and contract. As soon however as this occurs a greater difference in speed occurs which consequently again increases the rubbing effect and heat generation tending to again expand the spring. This action continues until very shortly is set up a virtual balance between the heat generation and the tendency to cool off so that the clutch continues to drive the load with a slight slippage between the driving and the driven face. This slippage balance may however not be necessary or even desirable in some cases and of course depends on the design of the parts.

When the motor stops the driving engagement is broken, the bi-metallic strips carrying the driving face, return to their original position. This result occurs because, as the bi-metallic element cools off, it automatically moves away from the driving face 7, back to the normal position shown in Fig. 3. This substantially disconnects the faces, at least so far as a driving engagement is concerned. The parts are then in their normal position ready for another operation.

In the alternative embodiment of my invention shown in Fig. 4 which is shown partially in perspective, the same thermostatic principle is taken advantage of but in a different form. In this case the driving member 2a carries a thermostatic strip construction which operates in a manner much similar to that previously described. In the modified construction however I have divided the thermostatic strip into two parts 14 and 15 similarly constructed. Each half such as 14 is normally curved as shown and provided with a loose connection to the driving head 2a which may be formed by a pair of pins 16 projecting radially from the surface of the driving head and passing loosely through holes 17 in the trailing end of the bi-metallic elements. As in the other construction, when the motor is started the driving head and bi-metallic strips 14 and 15 are rotated in the direction of the arrow and the friction against the driven friction surface 7 will similarly generate heat and expand them into driving connection with the driven member. This construction attains some advantages over the one shown in the other figures although of course both operate on the same general principle.

I am aware that my invention may be embodied in a variety of forms other than the embodiment illustrated in the drawing.

I claim:

1. In a friction clutch, driving and driven faces in rubbing contact, and thermostatic means operated by the generated heat to cause a driving engagement between said faces.

2. In a friction clutch, driving and driven faces in rubbing contact, and thermostatic means operated by the generated heat to cause a driving engagement between said faces, said means comprising a bi-metallic thermostatic strip or strips arranged also to release the driving engagement when the driving member stops.

3. In a friction clutch, a driving and a driven member and thermostatic means operated by heat generated through a difference in speed of said elements and arranged automatically to set up a driving balance between them.

4. In a friction clutch, a driving and a driven member, and an interposed thermostatic element arranged to engage the members by the friction-generated heat.

5. In a friction clutch, a driving member having thereon a thermostatic spring wound in the direction of its rotation and adapted to engage a friction face upon the driven member and to be expanded by the heat generated by rubbing contact between the two and to contract and discontinue the driving engagement when the driving element stops.

6. In a friction clutch, a driving and a driven member, the driving member having one or more thermostatic strips or elements adapted to expand and cause driving engagement between the two members, said strips or elements being loosely mounted whereby they may remove relatively to the carrier member.

7. In a friction clutch, driving and driven faces in rubbing contact, and thermostatic means operated by the generated heat to cause a driving engagement between said faces and controlled to cause the disengagement of said faces when said generated heat is dissipated.

8. In a friction clutch, driving and driven members and thermostatic means controlled by the heat generated by the rubbing contact between said members for controlling the driving engagement of said members.

Signed at Passaic, New Jersey this 10th day of August, 1931.

GEORGE S. LANE.